US010159055B2

(12) United States Patent
McCune et al.

(10) Patent No.: US 10,159,055 B2
(45) Date of Patent: Dec. 18, 2018

(54) GPS TIME-AIDING AND FREQUENCY CORRECTION

(71) Applicant: GOOGLE TECHNOLOGY HOLDINGS LLC

(72) Inventors: Timothy M. McCune, Mundelein, IL (US); Michael E. Russell, Lake Zurich, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 15/631,769

(22) Filed: Jun. 23, 2017

(65) Prior Publication Data
US 2017/0295555 A1  Oct. 12, 2017

Related U.S. Application Data

(63) Continuation of application No. 14/457,371, filed on Aug. 12, 2014, now Pat. No. 9,712,229.

(51) Int. Cl.
| H04W 56/00 | (2009.01) |
| H04B 7/26  | (2006.01) |
| H04W 4/80  | (2018.01) |
| G01S 19/05 | (2010.01) |
| G01S 19/25 | (2010.01) |
| H04W 76/10 | (2018.01) |

(52) U.S. Cl.
CPC .......... H04W 56/004 (2013.01); G01S 19/05 (2013.01); G01S 19/256 (2013.01); H04B 7/26 (2013.01); H04W 4/80 (2018.02); H04W 76/10 (2018.02)

(58) Field of Classification Search
CPC ........ H04B 7/26; H04W 4/80; H04W 56/004; H04W 76/10
See application file for complete search history.

(56) References Cited

U.S. PATENT DOCUMENTS

| 6,788,249 B1 | 9/2004 | Farmer et al. |
| 8,233,470 B2 | 7/2012 | Yang et al. |
| 2007/0030841 A1 | 8/2007 | Lee et al. |
| 2007/0182625 A1* | 8/2007 | Kerai ............... G01S 5/0072 342/357.62 |
| 2008/0224924 A1 | 9/2008 | Lethbridge |
| 2008/0258965 A1* | 10/2008 | Azim ................ G01S 19/256 342/357.43 |
| 2009/0052506 A1 | 2/2009 | Valio et al. |

(Continued)

FOREIGN PATENT DOCUMENTS

| KR | 20110095740 A | 8/2011 |
| WO | WO-2013166690 A1 | 11/2013 |

OTHER PUBLICATIONS

"International Preliminary Report on Patentability", PCT Application No. PCT/US2015/043954, dated Feb. 14, 2017, 8 pages.

(Continued)

Primary Examiner — Shaima Q Aminzay
(74) Attorney, Agent, or Firm — Colby Nipper

(57) ABSTRACT

A system and method for time-aiding an autonomous Global Positioning System device over a Bluetooth connection allows for a faster time to fix by allowing faster acquisition of time and ephemeris data. The time-aiding information may be distributed in a one-to-one manner or in a manner that allows for the synchronization of multiple devices.

20 Claims, 6 Drawing Sheets

(56) References Cited

U.S. PATENT DOCUMENTS

| | | |
|---|---|---|
| 2009/0219200 A1* | 9/2009 | Tryding .................. G01S 19/05 342/357.72 |
| 2010/0060514 A1 | 3/2010 | Wang et al. |
| 2010/0141520 A1 | 6/2010 | Ghinamo et al. |
| 2010/0188286 A1 | 7/2010 | Bickerstaff et al. |
| 2010/0309051 A1 | 12/2010 | Moshfeghi |
| 2011/0163914 A1 | 7/2011 | Seymour |
| 2012/0257614 A1 | 10/2012 | Chin et al. |
| 2013/0122929 A1 | 3/2013 | Al-Mufti et al. |
| 2013/0254419 A1 | 9/2013 | Millington |
| 2013/0324154 A1 | 12/2013 | Raghupathy et al. |

OTHER PUBLICATIONS

"International Search Report and Written Opinion", PCT Application No. PCT/US2015/043954, dated Oct. 30, 2015, 11 pages.

\* cited by examiner

GPS TIME-AIDING AND FREQUENCY CORRECTION

TECHNICAL FIELD

The present disclosure is related generally to mobile-device time resolution and, more particularly, to a system and method for enhancing mobile-device time resolution via Global Positioning System ("GPS") aiding for an electronic device such as a watch connected to a mobile device.

BACKGROUND

In general, a GPS receiver determines its current position by referencing a number of GPS satellites which transmit time and position data in coded signals. The position data, known as ephemeris data, are used by the GPS receiver to resolve the locations of each of the satellites of interest. When received satellite transmission signal strengths exceed particular thresholds, the transmissions can be decoded by the GPS receiver. The GPS receiver is able to resolve its three-dimensional ("3D") position via trilateration once its time has been synchronized with at least one satellite and ephemeris data have been decoded for at least four satellites. The amount of time required to calculate a position solution is also dependent on the information that is available to the GPS receiver, e.g., its position and time information.

The present disclosure is directed to a system that may decrease the amount of time required to calculate a position solution or decrease the complexity or computational resources required to calculate such a solution. However, it should be appreciated that any such benefits are not limitations on the scope of the disclosed principles or of the attached claims, except to the extent expressly noted in the claims. Additionally, the discussion of technology in this Background section is merely reflective of inventor observations or considerations and is not intended to be admitted or assumed prior art as to the discussed details. Moreover, the identification of the desirability of a certain course of action is the inventors' observation, not an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

The term "cold start" refers to a condition wherein the GPS receiver has no prior information regarding position or time, meaning that ephemeris decoding and time-synchronization must both occur before a 3D position may be calculated. The cold start process typically requires 35 to 60 seconds in open sky conditions, that is, where there are line-of-sight paths to the required satellites, but even in the best conditions, at least about 24 seconds are required due to the length and periodicity of the broadcast ephemeris data.

The term "warm start" refers to a condition wherein the receiver has a time and position estimate that can be used in deriving the current position solution. Since full ephemeris data are typically not available as in a hot-start condition, such data will still generally need to be downloaded. The term "hot start" refers to a condition wherein the GPS receiver has a time and position estimate wherein the ephemeris information is already present (and valid), such that only the receiver time needs to be verified from the satellite signals. Typically, this time verification can be executed in a matter of seconds. In addition to the foregoing, autonomous GPS solutions have introduced synthetic aiding to reduce the time to first fix and also serve to lower the minimum signal strength needed to obtain a three-dimensional position fix.

In an embodiment of the disclosed principles, a technique for time-aiding is provided that is especially beneficial for receivers with synthetic ephemeris aiding. In overview, the disclosed time-aiding technique may provide such a device with as much as an 11 dB gain or more on the minimum signal strength required to calculate a position. The disclosed technique may also substantially reduce fix times. Although generally useful, such improvements may be especially beneficial with respect to small wearable devices having reduced antenna volume and lower antenna performance than larger fitness-dedicated devices with patch antennas.

Turning now to a more detailed discussion in conjunction with the attached figures, techniques of the present disclosure are illustrated as being implemented in a suitable environment. The following description is based on embodiments of the disclosed principles and should not be taken as limiting the claims with regard to alternative embodiments that are not explicitly described herein. Thus, for example, while FIG. 1 illustrates an example mobile device with respect to which embodiments of the disclosed principles may be implemented, it will be appreciated that many other devices such as but not limited to laptop computers, tablet computers, personal computers, embedded automobile computing systems, and so on may also be used.

Figure 1:
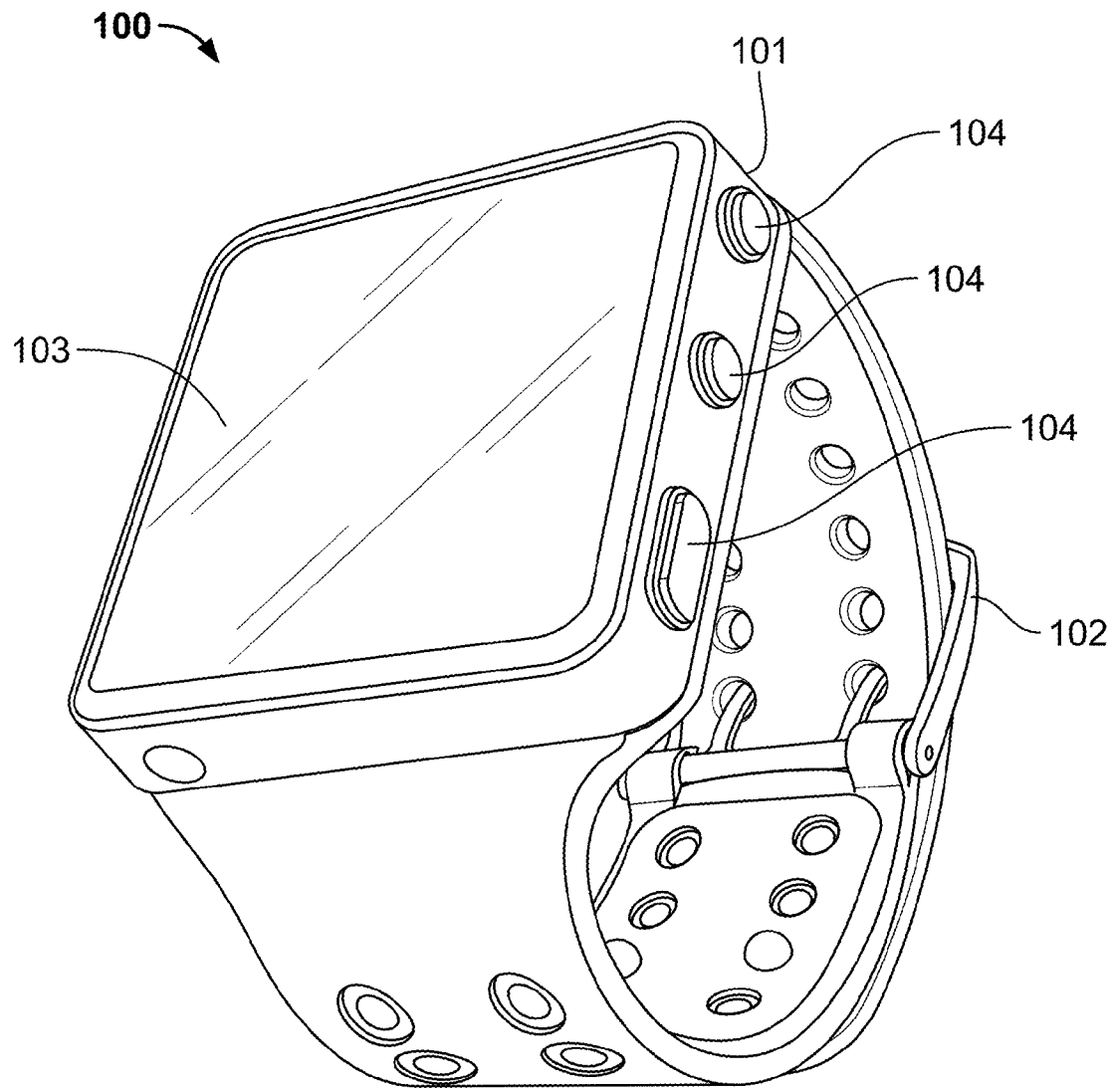
FIG. 1 illustrates an example mobile electronic device within which embodiments of the disclosed principles may be implemented.
Figure 2:
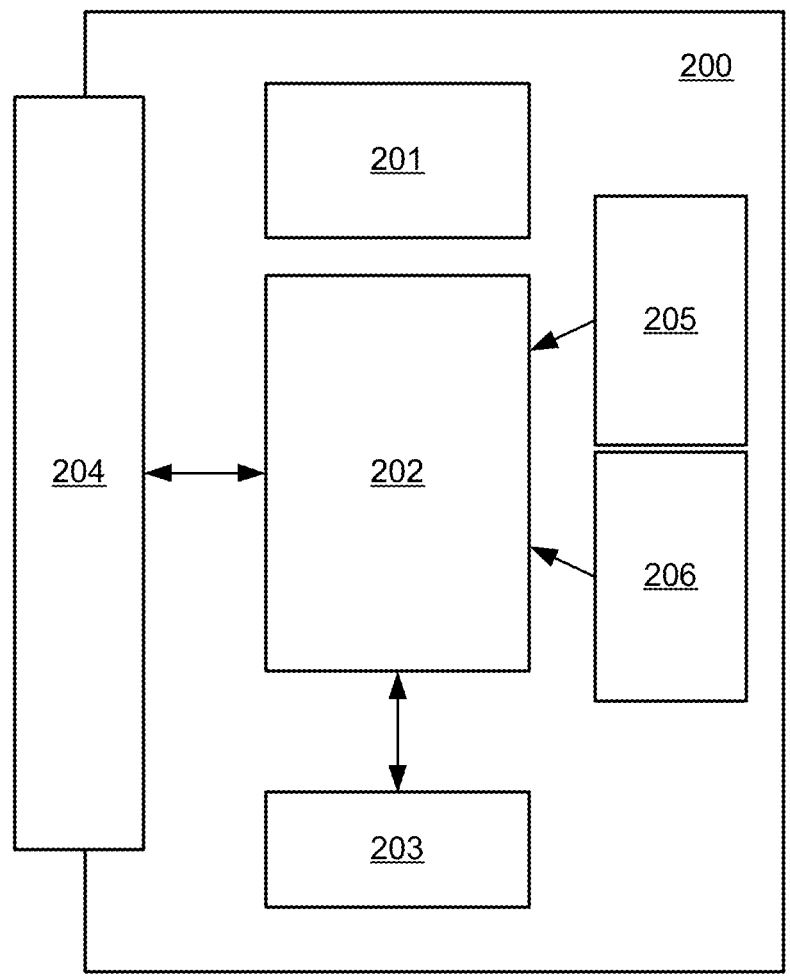
FIG. 2 is a simplified architectural view of the mobile electronic device of FIG. 1.

The schematic diagram of FIG. 1 shows a perspective drawing of an exemplary mobile wearable device within which embodiments of the disclosed principles may be implemented. In particular, the illustrated device 100 is a wearable watch having extended functionality beyond keeping time. The illustrated watch 100 includes a case 101 containing hardware components including electronic components for structural and functional operation of the watch 100. The electronic components are described in greater detail with respect to FIG. 2.

The illustrated watch 100 also includes a band or strap 102, usable to affix the watch 100 to a user's wrist or forearm. In this way, the user may turn his or her wrist to view a face or display 103 of the watch 100 periodically. As suggested above, while a watch is used for telling time in a traditional sense of the word, the illustrated device 100 is a computerized device having many functions. While one of these functions may be to keep and display the time of day, other functions may include location services, e.g., via GPS, communication services (e.g., via cellular or other wireless facilities), vital-sign detection and recording, stride detection and recording, and so on.

In an embodiment, the watch 100 may also include hardware user-interface controls 104. These can include, for example, power controls, display-mode controls, communication controls, privacy controls, and so on. As noted above, the watch case 101 contains a number of structural and electronic components that support the use and functioning of the watch. A simplified electronic architecture of the internal electronic components is shown by way of example in FIG. 2.

In the illustrated arrangement 200, the watch contains a power source 201, which may be, as discussed, a battery, fuel cell, or other source of electrical power for the remaining electrical components. Also included in the illustrated architecture is a processor 202, which may be a stand-alone microprocessor or an embedded processor within a controller, microcontroller, or other computerized component or module.

The processor 202 operates by executing computer-executable instructions that are electronically read from a non-transitory computer-readable medium 203. The medium 203 may be any suitable volatile or nonvolatile medium or combination of multiple such media. The processor 202 receives inputs from a device display 204 which is a touch-screen display in the illustrated embodiment, from one or more sensors including a 3D accelerometer 205, and optionally from hardware user controls 206.

Figure 3:
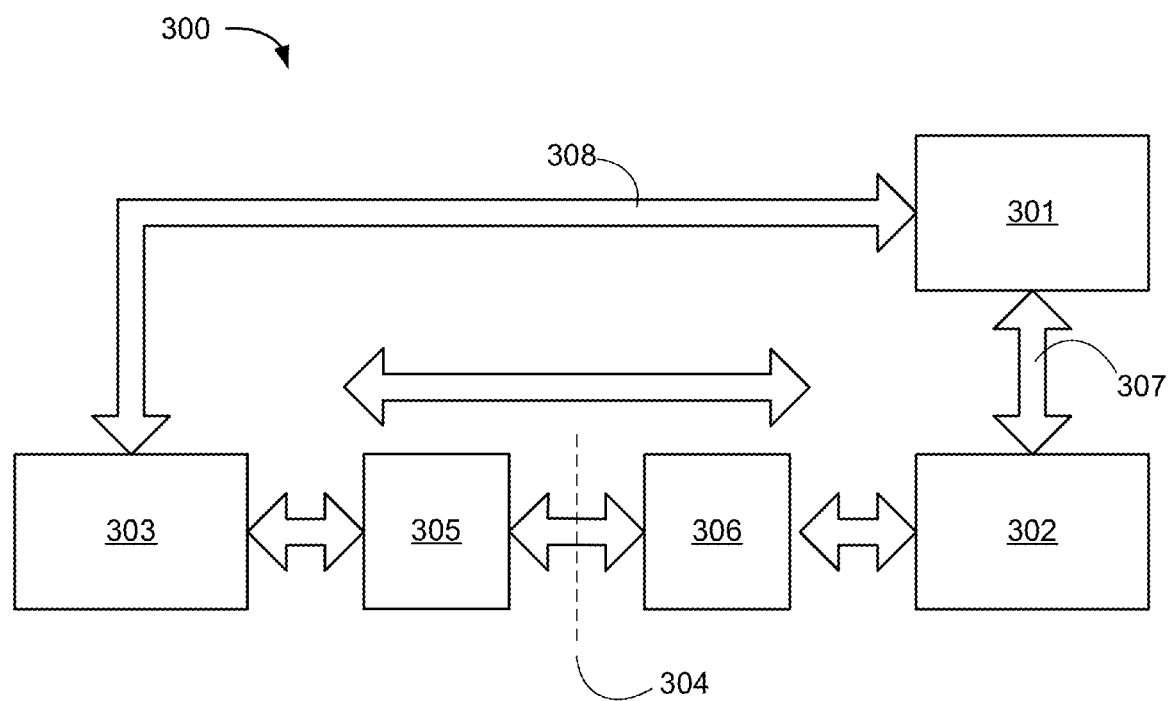
FIG. 3 is a simplified network schematic showing a wireless environment within which embodiments of the disclosed principles may be implemented.

In an embodiment having particular applicability to long term evolution ("LTE") networks and to Worldwide Interoperability for Microwave Access ("WiMax"), a radio-signaling interface for pseudo packet-arbitration is utilized along with a mechanism for adjusting a piconet clock (a clock in a wireless Bluetooth network) to align with the boundaries of the LTE frame events. A simplified schematic of the interface is shown in FIG. 3. The illustrated device 300 includes a Bluetooth host 301, a Bluetooth controller 302, and an example device illustrated as a Mobile Wireless Standards ("MWS") module 303, which contains fourth generation radio capabilities.

The MWS module 303 exchanges MWS co-existence logical signals with the Bluetooth controller 302 over the hardware boundary via an MWS co-existence physical bus 304, device bus hardware 305, and controller hardware 306. The Bluetooth controller 302 and Bluetooth host 301 exchange control signals and underlying data and feedback over a host-control channel 307. A direct interface 308 between the Bluetooth host 301 and the MWS device 303 may also be used.

As will be appreciated, a cellular radio using a radio-frequency band adjacent to the Bluetooth Industrial, Scientific, and Medical band (2.4 GHz) may have out-of-band products that bleed into the Bluetooth band. Similarly, Bluetooth transmissions may have out-of-band products that bleed into the adjacent cellular band. As a result, when the cellular radio is transmitting, it may drown out Bluetooth transmissions, and when the Bluetooth radio is transmitting it may interfere with cellular reception.

The co-existence interface is provided to align the two network types (which have two non-aligned clocks and separately scheduled traffic) so that they can take advantage of opportune transmission and reception times. For example, it may be desirable to have the Bluetooth radio transmit when MWS transmits and to have the Bluetooth radio receive when MWS receives. The co-existence interface allows for this type of alignment and coordination.

Figure 4:
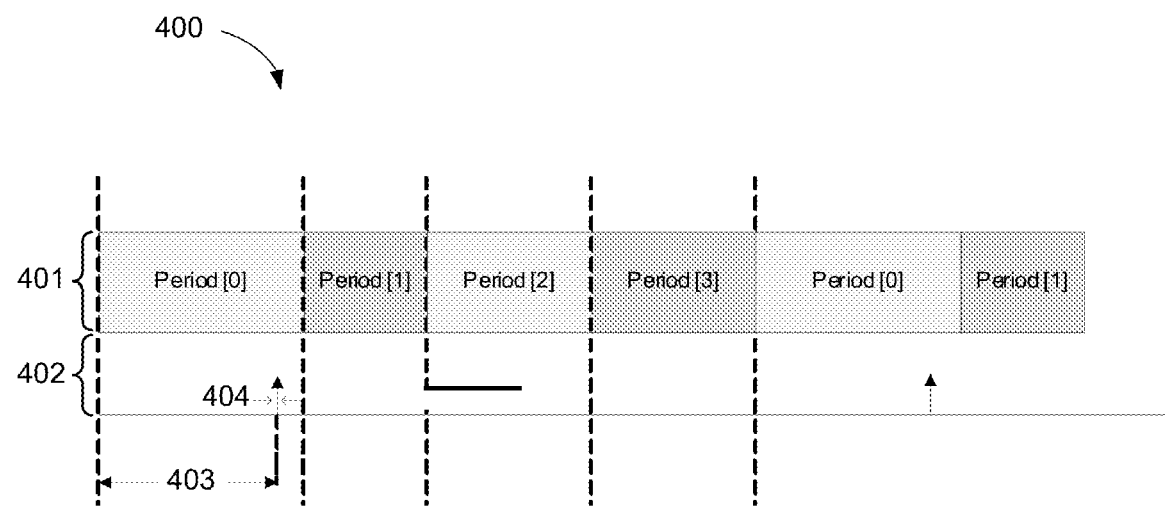
FIG. 4 is a frame-timing diagram showing time-synchronization information usable in an embodiment of the disclosed principles.

As noted above, in an embodiment, the piconet clock is adjusted to align with the boundaries of the LTE frame events. In greater detail with reference to the timing diagram of FIG. 4, the piconet clock adjustment aligns the Bluetooth network clock reflected in the MWS frame series 401 with the Frame Synchronization pulse series 402. FIG. 4 also shows the frame synchronization jitter 404, which introduces a small degree of inaccuracy.

As noted above in passing, a piconet is a network of devices linked over Bluetooth. The Bluetooth or piconet clock is derived from a free-running reference clock and is used simply to coordinate the timing for over-the-air events between piconet devices. As such, the piconet clock is not typically aligned, other than by chance, with other clocks in the system.

The piconet clock is adjustable under the Bluetooth protocol, and the adjustment can be executed at least coarsely with a resolution in microseconds by using a slot offset command. The MWS frame synchronization offset 403 is shown in FIG. 4. Alternatively, piconet clock adjustment can be accomplished less abruptly, referred to for purposes of this disclosure as fine resolution, by allowing the timing to drift so that the Bluetooth piconet clock can be corrected by 40 microseconds every second. The foregoing two methods may be used in conjunction with a frame synchronization pulse and over-the-air message in an embodiment to correct the mobile device's local free-running clock to the LTE-corrected clock of the connected device. The clock of the connected device, e.g., a GPS device, is a reference clock.

Figure 5:
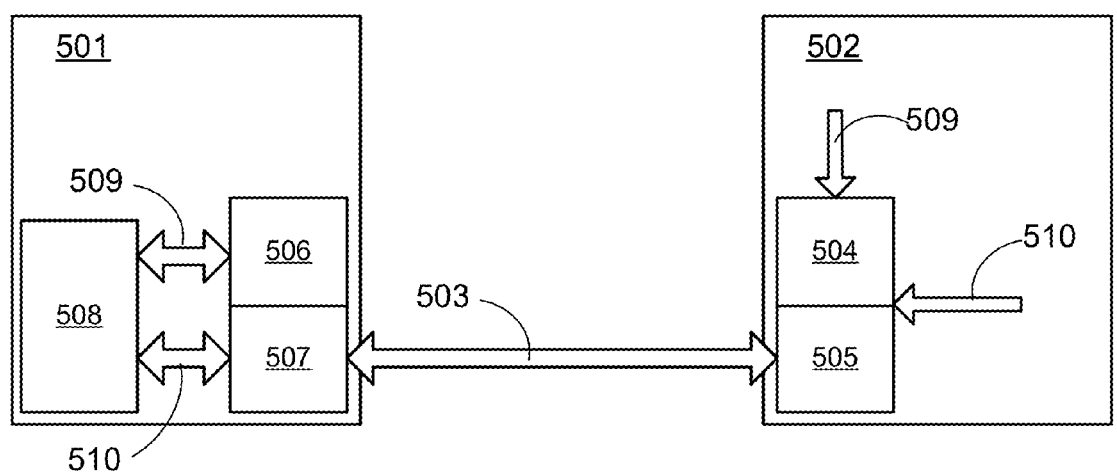
FIG. 5 is a modular diagram showing an architecture used in accordance with an example embodiment of the disclosed principles.

Turning to external time aiding, the aligned time can now be used through the GPS aiding interface to provide time-aiding to an otherwise autonomous GPS device, improving time-to-fix and signal-level performance despite the smaller antenna volume associated with such devices. FIG. 5 is a simplified schematic showing an autonomous small electronic device exemplified as a watch 501, e.g., the watch 100 shown in FIG. 1, connected to user device 502, such as a mobile phone, tablet, or other device via a Bluetooth link 503. The user device 502 has a third generation or LTE and WiMax modem. The Bluetooth link 503 is created and supported by a user-device Bluetooth host 504 and user-device Bluetooth controller 505 at the user device 502 and by a watch Bluetooth host 506 and watch Bluetooth controller 507 at the watch 501. The watch 501 also includes a GPS receiver 508.

In operation, the user device 502 receives ephemeris aiding data 509 as well as frame synchronization signals 510. The user device 502 passes slot offset, clock drift, and timing messages to the watch Bluetooth host 506 and watch Bluetooth controller 507 via the Bluetooth link 503. The Frame Synchronization Signals correct the relative phase of the Bluetooth clock, and thus, these messages are what establish the absolute phase on the user device 501. In turn, the watch Bluetooth host 506 and watch Bluetooth controller 507 pass ephemeris aiding and timing aiding information respectively to the GPS receiver 508.

The Bluetooth specification also provides a broadcast mechanism called Unicast Directionless Data ("UDD") and can provide a synchronization train of 120 Hz or more. This mechanism is provided for use by 3D glasses manufacturers to synchronize the left and right shutters of Bluetooth glasses to the picture of a 3D TV so that the processed image appears to the user to be 3D. However, in an embodiment of the disclosure this synchronization train is employed to provide at least 10 ms resolution for time aiding to a device such as the watch 501.

The use of the UDD synchronization train does not require a connection between the watch and another mobile device. However, it also only provides a phase and offset correction, but does not necessarily provide absolute time, which would require the use of additional messaging. In an embodiment, this additional messaging is accomplished by supplementing the payloads of the synchronization message. Because synchronization in this embodiment does not require a device-to-device connection, multiple devices can be time-synchronized without creating connections. The time aiding with absolute phase adjustment allows the GPS receiver 508 not only to quickly identify the locations of the required satellites but also to quickly resolve its own location given the accurate timing data.

In an embodiment, in order to obtain the absolute phase, a GPS or cellular time is associated with frame synchronization pulses so that an over-the-air message of GPS time can be mapped once the relative phase is adjusted. Then the over-the-air message, with mapped time instant, allows the coexistence interface on the watch or other GPS device to be used for GPS time aiding.

Frequency correction can be accomplished in this embodiment using time-transfer methods. For example, in a further embodiment, once the connection is established, the devices stay in high power mode (e.g., using a fast clock) and, based on scheduled radio wake-ups, run a routine to check if the device clock is drifting fast or slow between successive samples. The successive samples do not need to be consecutive but the relative time difference between them should be known. Further, a fractional-n phase-locked loop or other accurate frequency synthesizer should be run in conjunction with the reference oscillator to provide a corrected reference.

Figure 6:
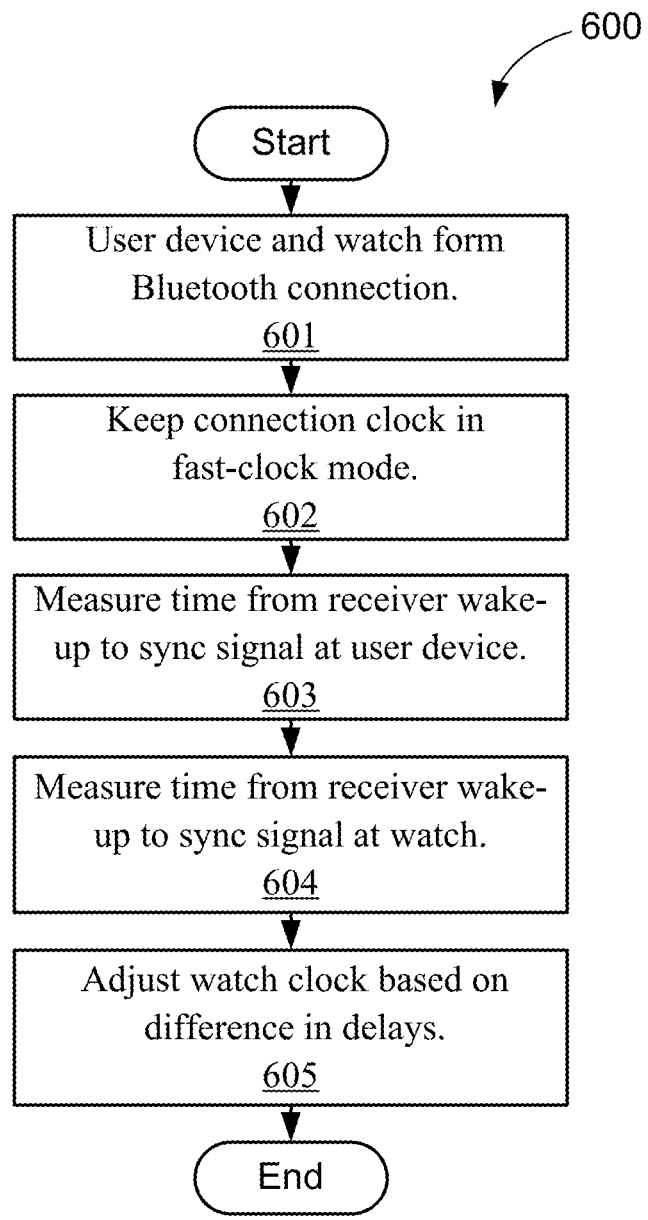
FIG. 6 is a flow chart showing a process of time-aiding for GPS in accordance with various embodiments of the disclosed principles.

The flowchart of FIG. 6 shows steps taken in this embodiment to accomplish drift correction. Initially, the drift, if any, of the reference system is determined, and then after correcting the high-frequency reference the low-frequency reference can then be adjusted. Turning to the figure, at stage 601 of the process 600, the user device and the watch form a connection over Bluetooth.

With that connection established, the clock is kept in the fast-clock mode at stage 602. At stage 603, the time from receiver wake-up at the user device to the synchronization signal is measured, and a similar delay is measured at the watch or other GPS device at stage 604. The difference, positive or negative, between these two measured delays is a reflection of clock drift, and as such, at stage 605, the watch clock is corrected based on the calculated delay.

In view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
   receiving, by a cellular radio of a mobile communications device, a cellular data packet, the cellular data packet comprising time-synchronization information;
   aligning, by the mobile communications device, a piconet clock of the mobile communications device with the time-synchronization information of the received cellular data packet, the aligning comprising communicating a frame synchronization pulse to a Bluetooth host of the mobile communications device, the aligning comprising a slot offset command, the aligning by the slot offset command executed at a resolution of microseconds;
   connecting the mobile communications device to a mobile Global Positioning System ("GPS") device, the connecting by the mobile communications device and over a Bluetooth link, the connecting coordinated to align communication by the cellular radio or other communication by the Bluetooth link to prevent a disruption of the communication by the cellular radio by operation of the Bluetooth link or to prevent another disruption of the other communication of the Bluetooth link by operation of the cellular radio; and
   transmitting, by the mobile communications device over the Bluetooth link and to the mobile GPS device, the time-synchronization information to synchronize a piconet clock of the mobile GPS device to the piconet clock of the mobile communications device, the piconet clock of the mobile GPS device configured to provide time-aiding to a GPS receiver of the mobile GPS device.

2. The method of claim 1, wherein aligning the piconet clock of the mobile communications device further comprises allowing the piconet clock to drift.

3. The method of claim 1, wherein the time-synchronization information comprises one or more of: a slot offset, clock drift, and a timing message.

4. The method of claim 1, further comprising transmitting ephemeris data over the Bluetooth link from the mobile communications to the mobile GPS device.

5. The method of claim 1, wherein the time-synchronization information includes a synchronization train in a Unicast Directionless Data transmission.

6. A Global Positioning System ("GPS") device comprising:
   a Bluetooth interface;
   a GPS module configured to identify a location of the GPS device; and
   a processor configured to:
     connect the GPS device to a mobile communications device via the Bluetooth link;
     receive time-synchronization information from the mobile communications device over the Bluetooth link, the time synchronization information comprising information associated with a piconet clock of the mobile communications device; and
     adjust a piconet clock of the GPS device based on the received time-synchronization information, the adjustment comprising a slot offset command, the adjustment by the slot offset command executed at a resolution of microseconds.

7. The GPS device of claim 6, wherein the time-synchronization information comprises one or more of: a slot offset, clock drift, and a timing message.

8. The GPS device of claim 6, wherein the piconet clock of the mobile communications device and the piconet clock of the GPS device are associated with the Bluetooth link.

9. The GPS device of claim 6, wherein the GPS device is a watch.

10. The GPS device of claim 6, wherein the processor is further configured to receive supplemental ephemeris data from the mobile communications device over the Bluetooth link.

11. The GPS device of claim 6, wherein the time-synchronization information is based on a cellular data packet received at the mobile communications device.

12. A method comprising:
establishing a Bluetooth connection between a Global Positioning System ("GPS") device and a mobile communications device;
receiving, from the mobile communications device, time-synchronization information associated with a piconet clock of the mobile communications device; and
synchronizing a piconet clock of the GPS device to the piconet clock of the mobile communications device using the time-synchronization information, the synchronizing comprising a slot offset command, the synchronizing by the slot offset command executed at a resolution of microseconds.

13. The method of claim 12, further comprising:
determining satellite ephemeris data for a plurality of terrestrial satellites at the GPS device;
establishing an absolute time reference based on the piconet clock of the GPS device; and
based on the absolute time reference and satellite ephemeris data, calculating the position of the GPS device via trilateration at the GPS device.

14. The method of claim 12 wherein the time-synchronization information comprises one or more of: a slot offset, clock drift, and a timing message.

15. The method of claim 12 wherein the GPS device is a watch.

16. The method of claim 12 further comprising receiving supplemental ephemeris data from the mobile communications device over the Bluetooth link.

17. The method of claim 12 wherein the time-synchronization information is based on a cellular data packet received at the mobile communications device.

18. The method of claim 12, wherein the piconet clock of the mobile communications device and the piconet clock of the GPS device are associated with the Bluetooth link.

19. The method of claim 12, wherein the piconet clock of the GPS device is used to provide time-aiding to a GPS receiver of the GPS device.

20. The method of claim 12, wherein the synchronizing the piconet clock of the GPS device further comprises allowing the piconet clock to drift.

* * * * *